US00RE43035E

(19) United States
(12) Reissued Patent
Schjerven, Sr. et al.

(10) Patent Number: US RE43,035 E
(45) Date of Reissued Patent: Dec. 20, 2011

(54) CONVEYOR OVEN HAVING AN ENERGY MANAGEMENT SYSTEM FOR A MODULATED GAS FLOW

(75) Inventors: William S. Schjerven, Sr., Schaumburg, IL (US); Mark A. Sieron, Arlington Heights, IL (US); Bruce Grau, Island Lake, IL (US); Adrian A. Bruno, Rolling Meadows, IL (US); Gerald J. Schneeweiss, Romeoville, IL (US); Sylvia Pauline Schneeweiss, legal representative, Romeoville, IL (US); Frank Carbonara, Mount Juliet, TN (US)

(73) Assignee: Middeby Marshall Incorporated, Elgin, IL (US)

(21) Appl. No.: 10/991,326

(22) Filed: Nov. 17, 2004

Related U.S. Patent Documents

Reissue of:

(64) Patent No.: 6,481,433
Issued: Nov. 19, 2002
Appl. No.: 09/883,786
Filed: Jun. 18, 2001

U.S. Applications:

(63) Continuation-in-part of application No. 09/760,194, filed on Jan. 12, 2001, now Pat. No. 6,684,875.

(60) Provisional application No. 60/249,685, filed on Nov. 17, 2000.

(51) Int. Cl.
*A21B 1/42* (2006.01)

(52) U.S. Cl. ..... 126/21 A; 126/116 A; 126/21 R; 99/443 C; 432/176; 432/121

(58) Field of Classification Search ..... 126/21 A, 126/21 R, 19 R, 116 A, 41 C, 373 R, 52, 126/35; 99/443 R, 443 C, 325, 326, 328, 99/329 R, 359, 360; 219/400; 251/12, 89, 251/118, 175, 331, 45; 432/239, 121, 133, 432/176, 128

See application file for complete search history.

(56) References Cited

U.S. PATENT DOCUMENTS

| | | | |
|---|---|---|---|
| 3,589,848 | A | 6/1971 | Potts |
| 3,861,854 | A | 1/1975 | Walbridge |
| 3,941,553 | A | 3/1976 | Bedford |
| 4,131,412 | A | 12/1978 | Matthews |
| 4,189,680 | A | 2/1980 | Clark |
| 4,201,924 | A | 5/1980 | Uram |
| 4,242,079 | A | 12/1980 | Matthews |
| 4,245,978 | A | 1/1981 | del Valle |

(Continued)

OTHER PUBLICATIONS

Owner's Operating & Installation Manual for Gas Oven Models Series PS360EWB; Middleby Marshall; Apr. 1996.

Selectra, A200 Signal Conditioner Bulletin MS2036-01/96; Jan. 1996; Maxitrol Company; Southfield, MI, USA.

Selectra, AP300 Signal Conditioner Bulletin MS2036A-03/00; Mar. 2000; Maxitrol Company; Southfield, MI, USA.

(Continued)

*Primary Examiner* — Steven B McAllister
*Assistant Examiner* — Sarah Suereth
(74) *Attorney, Agent, or Firm* — Michael Best & Friedrich LLP

(57) ABSTRACT

A conveyor oven has a modulating gas valve which raises and lowers the thermal output of a burner that heats the oven. A bypass line passes a minimum amount of gas to prevent the burner from completely shutting down during periods while the oven remains above a threshold demand for more heat. Electrical isolation is provided between temperature controlling devices to prevent an electrical feed back which might otherwise prevent a complete shut down of the oven during hazardous conditions.

11 Claims, 10 Drawing Sheets

U.S. PATENT DOCUMENTS 4,281,358 A 7/1981 Plouffe et al.
4,359,315 A 11/1982 Matthews
4,403,942 A 9/1983 Copenhaver
4,457,291 A 7/1984 Henke
4,462,383 A 7/1984 Henke et al.
4,479,776 A 10/1984 Smith
4,492,839 A 1/1985 Smith
4,519,771 A 5/1985 Six et al.
4,615,282 A 10/1986 Brown
4,626,661 A 12/1986 Henke
4,662,838 A 5/1987 Riordan
4,676,151 A 6/1987 Gorsuch et al.
4,700,685 A 10/1987 Miller
4,701,340 A 10/1987 Bratton et al.
4,739,154 A 4/1988 Bharara et al.
4,749,581 A 6/1988 Gorsuch et al.
4,750,276 A 6/1988 Smith et al.
4,753,215 A 6/1988 Kaminski et al.
4,757,800 A 7/1988 Shei et al.
4,760,911 A 8/1988 Bacigalupe et al.
4,781,169 A 11/1988 Henke et al.
4,787,842 A 11/1988 Stewart et al.
4,792,303 A 12/1988 Stewart et al.
4,834,063 A 5/1989 Hwang et al.
4,835,351 A 5/1989 Smith et al.
4,846,143 A 7/1989 Csadenyi
4,846,647 A 7/1989 Stewart et al.
4,881,519 A 11/1989 Henke
4,882,981 A 11/1989 Bacigalupe et al.
4,884,552 A 12/1989 Wells et al.
4,928,663 A 5/1990 Nevin et al.
4,941,819 A 7/1990 Stewart et al.
4,964,392 A 10/1990 Bruno et al.
4,981,416 A 1/1991 Nevin et al.
5,012,071 A 4/1991 Henke
5,025,775 A 6/1991 Crisp
5,045,658 A 9/1991 Smith
5,078,050 A 1/1992 Smith
5,134,263 A 7/1992 Smith et al.
5,147,994 A 9/1992 Smith et al.
5,154,160 A 10/1992 Burtea et al.
5,161,889 A 11/1992 Smith et al.
5,197,375 A 3/1993 Rosenbrock et al.
5,205,274 A 4/1993 Smith et al.
5,210,387 A 5/1993 Smith et al.
5,249,739 A 10/1993 Bartels et al.
5,253,564 A 10/1993 Rosenbrock et al.
5,277,105 A 1/1994 Bruno et al.
5,289,500 A 2/1994 Inou et al.
5,310,978 A 5/1994 Smith et al.
5,361,749 A 11/1994 Smith et al.
5,365,918 A 11/1994 Smith et al.
5,379,752 A 1/1995 Virgil, Jr. et al.
5,398,666 A 3/1995 Smith et al.
5,401,940 A 3/1995 Smith et al.
5,404,808 A 4/1995 Smith et al.
5,449,888 A 9/1995 Smith et al.
5,492,055 A 2/1996 Nevin et al.
5,510,601 A 4/1996 Smith et al.
5,539,187 A 7/1996 Smith et al.
5,547,373 A 8/1996 Snell
5,582,758 A 12/1996 Smith et al.
5,717,192 A 2/1998 Dobie et al.
5,818,014 A 10/1998 Smith et al.
5,819,721 A 10/1998 Carr et al.
5,821,503 A 10/1998 Witt
5,864,120 A * 1/1999 Vroom et al. ..... 219/400
5,919,039 A 7/1999 Shaw et al.
5,958,274 A 9/1999 Dobie et al.
6,018,466 A 1/2000 Lucian
6,037,580 A 3/2000 Renk
6,123,063 A 9/2000 Boerjes
6,131,559 A * 10/2000 Norris et al. ..... 126/21 A
6,149,065 A 11/2000 White et al.
6,171,630 B1 1/2001 Stanger et al.
6,216,683 B1 4/2001 Maughan
6,217,312 B1 4/2001 Levinson et al.
6,250,296 B1 6/2001 Norris et al.
6,481,433 B1 11/2002 Schjerven, Sr. et al.
6,526,961 B1 3/2003 Hardenburger
6,576,874 B2 6/2003 Zapata et al.
6,655,373 B1 12/2003 Wiker
6,684,657 B1 2/2004 Dougherty
6,684,875 B1 2/2004 Schjerven, Sr. et al.
6,817,283 B2 11/2004 Jones et al.
6,920,820 B2 7/2005 Meggison et al.
6,933,473 B2 8/2005 Henke et al.

OTHER PUBLICATIONS

Bakers Pride Oven Company, Inc.; APC-18 Electric Conveyor Oven; Jul. 2000.

Bakers Pride Oven Company, Inc.; Model VHVA-1620E Electric Forced Air Counter Top Conveyor Ovens; Mar. 2003.

Bakers Pride Oven Company, Inc.; Model VHVA-1828E DualAir Electric Impingement Counter Top Conveyor Ovens; Jan. 2005.

Bakers Pride Oven Company, Inc.; VH1620E, AHVA1620E, VH1828E & VHVA1828E Electric Countertop Conveyor Ovens—Parts Lists & Exploded Views; May 2005.

7.4 Electrical Diagram, 3270-TS-D Left Hand Side, XLT-3200-TS-D Installation & Operation Manual, p. 48.

7.5 Electrical Diagram, 3270-TS-D- Right Hand Side, XLT-3200-TS-D Installation & Operation Manual, p. 49.

Owner's Operating & Installation Manual for Gas Over Models Series PS360EWB Apr. 1996.

* cited by examiner

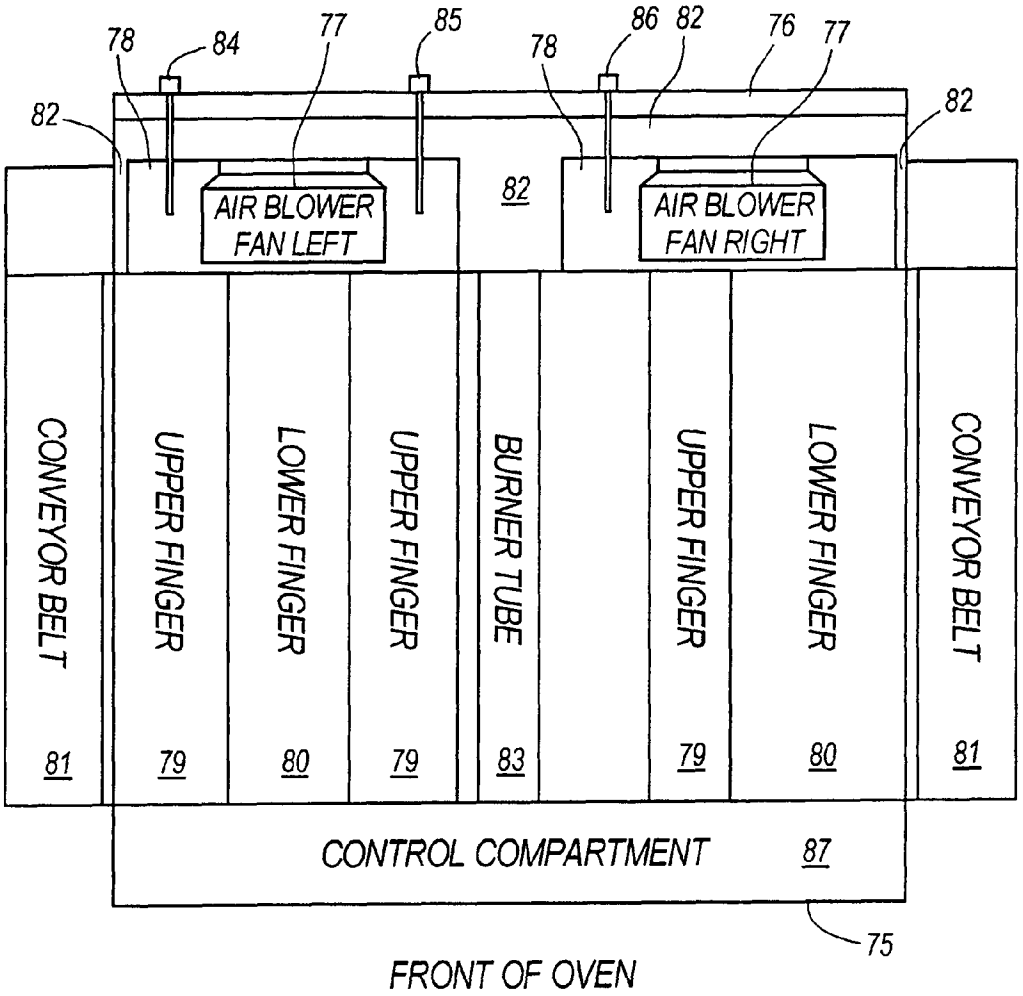
FIG. 7B (AMENDED)

CONVEYOR OVEN HAVING AN ENERGY MANAGEMENT SYSTEM FOR A MODULATED GAS FLOW

Matter enclosed in heavy brackets [ ] appears in the original patent but forms no part of this reissue specification; matter printed in italics indicates the additions made by reissue.

This is a continuation-in-part of Ser. No. 09/760,194 filed Jan. 12, 2001 which *now U.S. Pat. No. 6,684,875*, in turn, claims priority from and replaces Provisional application Serial No. 60/249,685, filed Nov. 17, 2000.

This invention relates to conveyor ovens having reduced fuel consumption and with quieter operation, and more particularly to such ovens having an energy management system including a modulated gas flow with a safety feature that isolates electrical controls in order to enhance an integrity of the safety features built into the oven.

BACKGROUND

Prior art conveyor ovens are shown in U.S. Pat. Nos. 4,964,392 and 5,277,105 owned by the assignee of this invention and in the references cited on the cover pages of these patents. These and other similar patents may be consulted in order to learn details of how conveyor ovens are constructed and operate. Often—but not always—this type of oven is used to cook or bake pizzas, bread, or the like.

Conveyor ovens are devices for automatically baking or cooking food products over timed periods. Normally, they have a conveyor belt which travels through an elongated oven cavity having open ends and at a speed which times the exposure of the food product to the heat of the oven. A food product, such as a pizza, for example, is placed on one end of the conveyor at the entry to the oven cavity and delivered from the oven at the opposite end of the cavity. The heat in the oven and the speed of the conveyor are coordinated so that the food product is fully and correctly cooked or baked by the time when the conveyor delivers it at the exit end.

The conventional method of delivering controlled heat has been to switch burners off and on in order to hold the resulting temperature in the oven cavity within a relatively narrow range. This process has functioned very well in the past. However, anything can always be improved and, therefore, it is always possible to do a better job heating and cooking or baking the food product.

Also, the cost of the fuel (natural or propane gas) for the burners is increasing sharply. Thus, an important goal is to reduce the fuel consumption, which the invention has done by approximately 30%.

A conveyor oven is usually energized by gas, which always requires a safety feature since an explosive atmosphere might be created by leaking gas. As a result, various governmental agencies prescribe an incorporation of safety features, such as a cut-off valve, into the design of the oven. It is important for the oven controls to be designed to not only enable a reliability of these safety features, but also to provide a redundancy for the safety features. In this invention, the safety features are enhanced by providing an electrical isolation between control signals that might otherwise cause a feed back that might enable the oven to continue operation or to re-ignite after a demand for shut down.

BRIEF DESCRIPTION OF THE INVENTION

Accordingly, an object of the invention is to cook or bake a better food product by maintaining a closer control over the uniformity of the heat in the oven cavity. Here, an object is to maintain a substantially smooth level of heat after the oven is switched on and continuing throughout the oven operation. In particular, an object is to avoid the peaks and valleys of heat swings as the burner switches on and off as it hunts for the targeted temperature.

Another object is to provide a quieter operation by eliminating a blower-like noise which occurred heretofore as the burner switched on.

Still another object is to provide a universal heat controller which can control either a modulating valve or an on/off valve, thereby eliminating a need for many controllers individually dedicated to specific ovens.

A further object of the invention is to provide a control circuit which insures the integrity of a safety feature built into the oven. Here, an object is to provide a self-healing control which so insures the integrity, but which docs not require a replacement of a fuse or other element after the condition requiring a safety valve operation subsides.

In keeping with an aspect of the invention, these and other objects are accomplished by a use of a modulating valve which increases or decreases the amount of the gas flow to a burner without fully switching the burner off or on during a bake cycle. The modulating valve is controlled responsive to temperatures sensed by thermocouple sensors located in the oven. Furthermore, the controller is also able to control an on/off gas valve in response to the same type of sensor signals, so that the same controller may be used universally for both the modern oven using the modulating valve and the older ovens using on/off valves.

The integrity of the safety features built into the oven is preserved by an isolation in the electrical control circuit between the elements which control the modulating valve and a conditioner which converts signals from sensors into signals which can enable an operation of the modulating valve. This isolation prevents feed back which might otherwise cause the modulating valve to behave in a way which would defeat the shutdown of an on/off safety valve. In order to provide a self-healing of this integrity insuring system, it uses transformers for separating and isolating the modulation valve control and conditioner circuits from an ignition control module.

The advantages of the invention are many. There is an improved reliability and a higher quality bake at a shorter bake time and at a lower average temperature. Since the ovens operate at a lower temperature, the components are in a cooler environment which extends their life. The oven is quieter and the energy management system is more efficient due to a use of the modulating gas valve and to a two-way air return, with less turbulence, creating lower DB noise levels. There is an increased flexibility making it easier to rearrange the fingers for delivering heated air to the food product. There is an ability to add a deck, as volume increases, or to remove a deck if volume falls off. All decks are the same.

BRIEF DESCRIPTION OF THE DRAWINGS

The invention will be better understood from the following specification taken with the accompanying drawings, in which:

FIGS. 7A and 7B are simplified cross sections showing a side elevation and a plan view which schematically show the location of temperature sensors in the oven;

DETAILED DESCRIPTION OF THE INVENTION

Figure 1A:
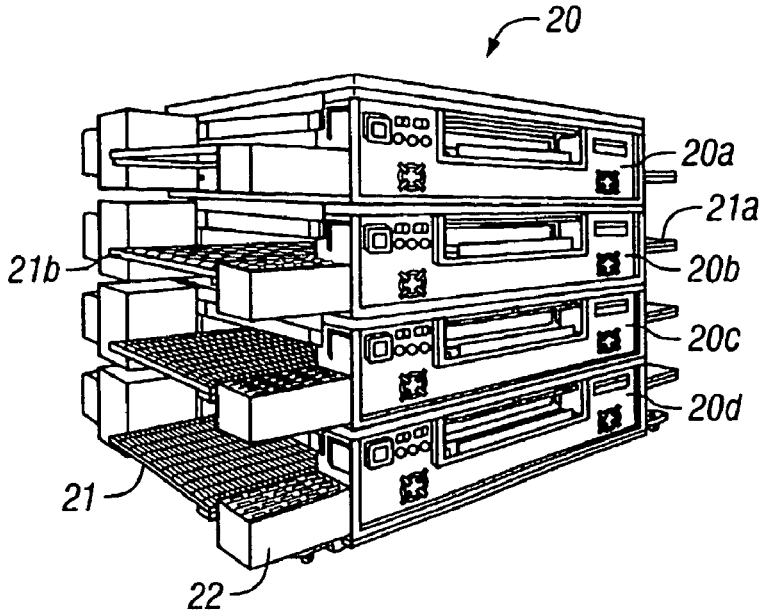
FIG. 1A is a perspective view which shows a plurality of ovens stacked one upon the other in order to increase baking capacity without increasing the oven footprint.
Figure 1B:
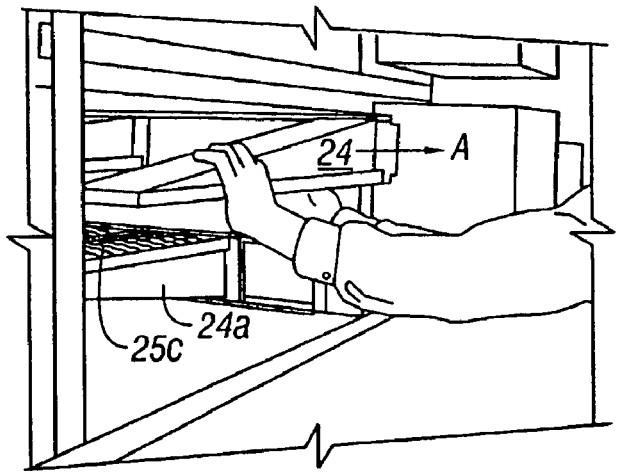
FIG. 1B is a perspective view of a hot air delivery finger being removed from the oven cavity.
Figure 1C:
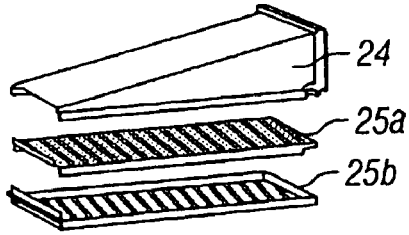
FIG. 1C is a perspective view of a disassembled finger.

The equipment in FIGS. 1A–1C shows a conveyor for delivering a stream of heated air through an oven cavity. More particularly, FIGS. 1A–1C are perspective views of a conveyor oven 20 which receives a conveyor 21 (FIG. 1A) extending from an input end 21a through a cavity to an output end 21b of the oven. The motor for driving the conveyor is in the housing 22.

FIG. 1A shows a plurality of the ovens 20a–20b (sometimes called "decks") stacked one on the other to increase the baking capacity without increasing the footprint dimensions. Each deck may be separately programmed to bake a different food product. FIG. 1B is a perspective view of a person removing a hot air delivery finger from an oven by sliding it in direction A along side rail tracks. FIG. 1C is a perspective view of the finger construction where two perforated plates 25a, 25b direct streams of hot air downwardly and onto the upper surface of a food product. Lower fingers 24a (FIG. 1B) direct hot air upwardly through perforated plate 25c and onto the lower surface of a food product. The hot air recycles by flowing from a plenum, through the fingers and returning between the top and bottom fingers to the plenum.

Figure 2:
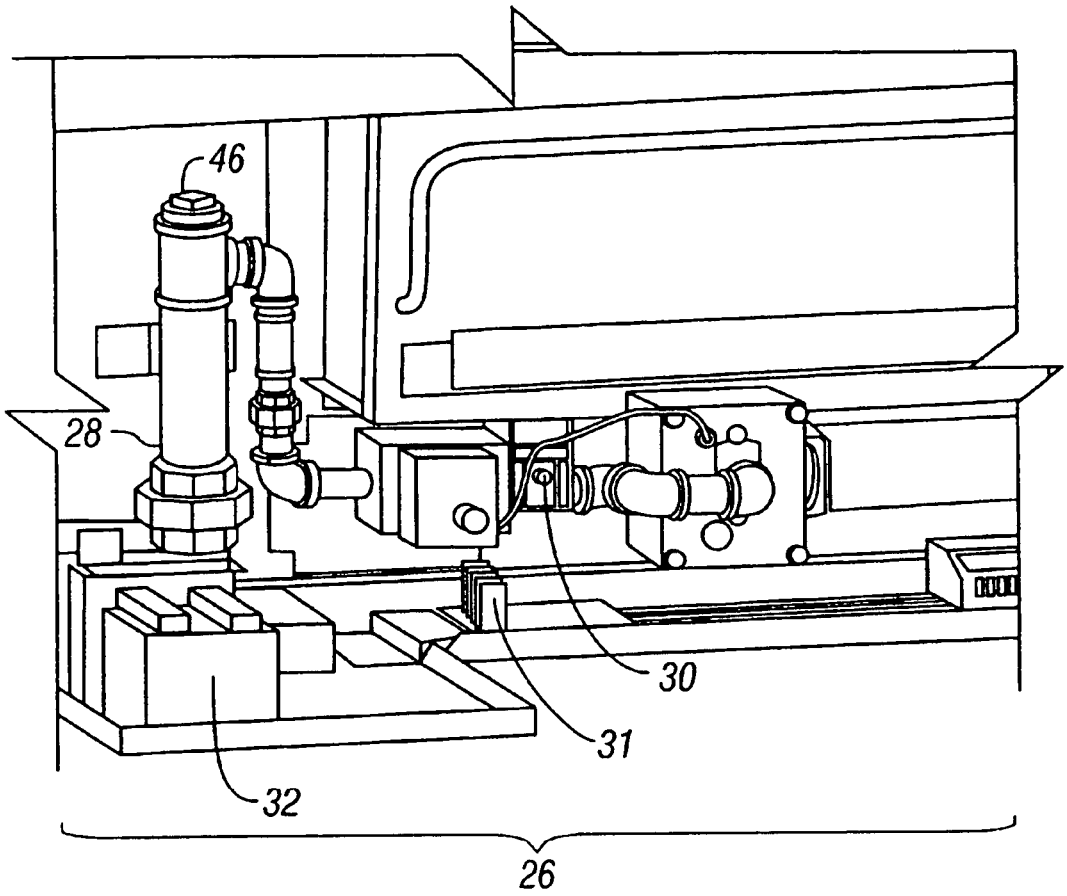
FIG. 2 is an enlarged view of that part of FIGS. 1A–1C which is material to the invention.
Figure 4A:
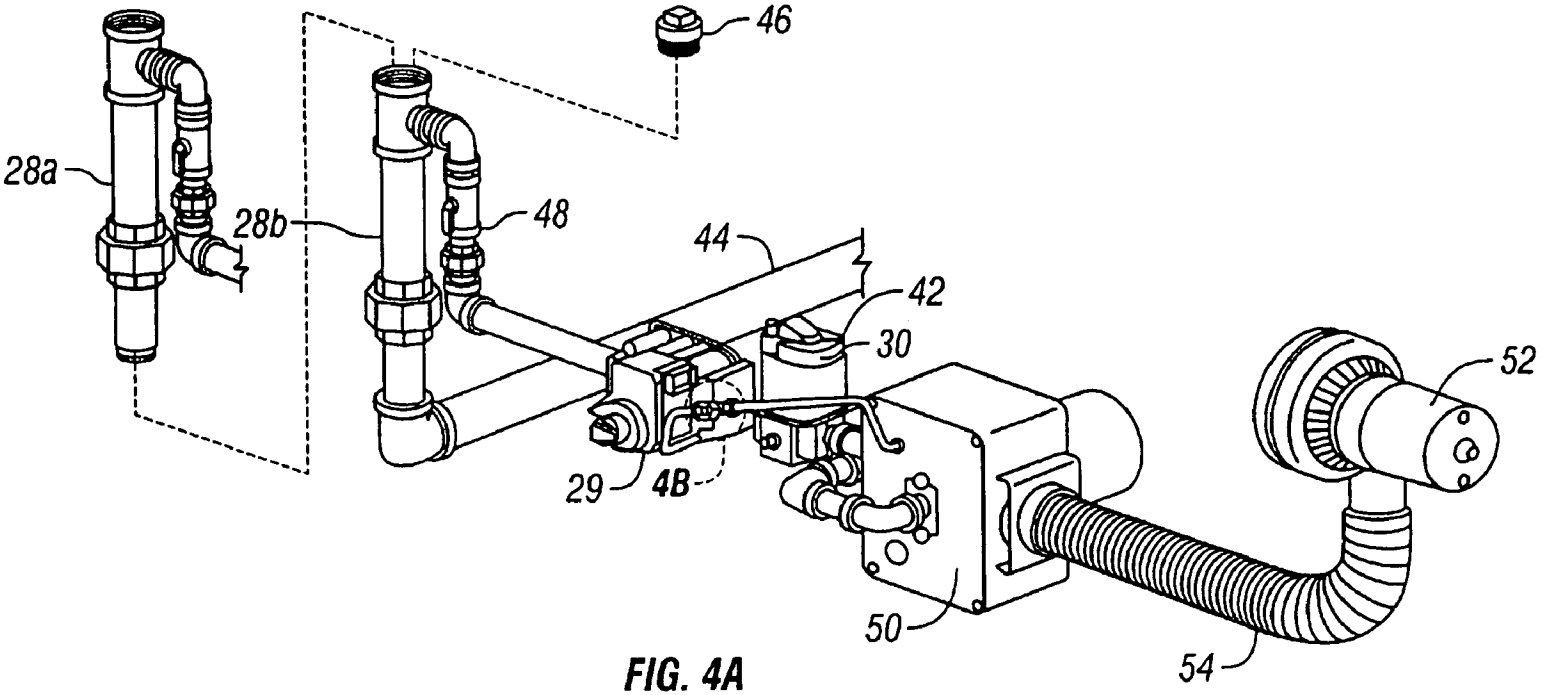
FIG. 4 is a schematic line drawing of the parts seen in FIG. 2, together with labels identifying the various items shown in the drawing.
Figure 4B:
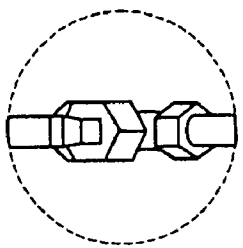

The material parts 26 of the oven energy management system are shown in greater detail in FIGS. 2 and 4. Natural or propane gas is fed from a source to the burner via a line 28 and a modulating valve 30 under the control of a signal conditioner 31 and a temperature controller 32. Both the preferred modulating valve 30 and signal conditioner 31 are products of the Maxitrol Company and are sold under the trademark "Selectra". The Maxitrol Company has a business address at 23555 Telegraph Rd (P.O. Box 2230), Southfield, Mich., U.S.A. 48037-2230. The temperature controller 32 is a product of the Honeywell Company.

Figure 3:
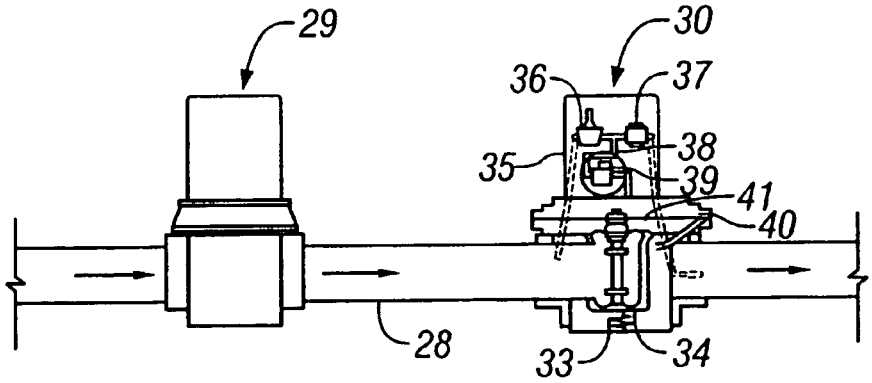
FIG. 3 is a view, partly in cross section, of an automatic safety on/off switch and a modulating switch coupled into in a gas line.

FIG. 3 shows gas line 28 extending from any suitable source of natural or propane gas on the left to a burner on the right. Interposed in the gas line between the source and the burner are two valves 29 and 30. Valve 29 is any suitable on/off valve usually prescribed by a governmental regulatory agency for safety purposes. For example, a conventional valve 29 might be adapted to shut down the gas delivery responsive to predetermined conditions such as excessive pressure appearing in the gas supply line, excess oven temperature, or the like.

The modulating valve 30 means is shown in cross section. A main spring 33 biases a main valve 34 into a position either to close or open the gas line 28 in order to prevent or enable a flow of gas to the burner. A by-pass line 35 is provided for enabling gas to flow around the main valve 34 and through a pressure regulator 36 even when valve 34 is closed, thereby continuously maintaining at least a minimum level burner operation. A manual valve 37 in the by-pass line may cut-off or allow the by-pass gas to flow, as a safety or shut down procedure. Midway between regulator 36 and the manual by-pass valve 37, a tap line 38 allows the by-pass gas to flow through modulator 39 in order to enable the gas to flow from the source into an upper chamber 40 which is closed by a diaphragm 41. Modulator 39 is controlled responsive to signals from thermocouple sensors 42 in the oven. As the oven becomes colder, the diaphragm moves down, and as it becomes hotter, the diaphragm moves up. Hence, the diaphragm 41 moves up or down as a function of the instantaneous oven temperatures.

As the diaphragm 41 moves down, it overcomes the bias of spring 33 and opens main valve 34 by a distance which enables a volume of gas to flow in line 28 depending on the distance that valve 34 has moved.

If the oven temperature sensed at 42 goes down, the modulator 39 enables more gas flow from the by-pass line 35 to increase pressure in upper chamber 40, thereby deflecting the diaphragm 41, pushing valve 34 against the bias of spring 33 and opening the main valve 34 by a discrete distance. If the oven temperature sensed at 42 goes up, modulator 39 restricts the flow of by-pass gas, the pressure in upper chamber 40 reduces, the diaphragm 41 returns somewhat from its deflected condition, and spring 33 pushes the valve 34 to a more closed position.

Hence, it should now be clear that the amount of gas delivered to the burner follows the instantaneous fluctuations of the oven temperature, while maintaining a minimum flow through by-pass line 35. With a need for a low heat, there is little or no pressure on the diaphragm 41 and gas flows only through a by-pass and at a very low rate. In between the high and low demands for a high level of heat and a low level of heat, the pressure in the upper chamber 40 has an intermediate effect upon the deflection of diaphragm 41 and, therefore, on the position of main valve 34 and the amount of gas flowing to the burner.

The temperature controller 32 (FIG. 2) is a device which receives a signal, preferably, from a pair of thermocouple sensors located in the baking cavity of the oven. The sensor may continuously supply any convenient signal indicating the instantaneous oven temperature. The signal conditioner 31 interfaces between the temperature controller 32 and the modulating valve 30 by converting the sensor signal into a signal which the modulating valve uses.

The details on the arrangement of the various parts described thus far are best seen in FIG. 4. The gas is delivered from any convenient source through a line 44 to the various ovens via a pipe 28. As here shown, it may be assumed that pipe 28a is in oven 20a (FIG. 1A) and pipe 28b is in oven 20b. The remainder of the ovens 20c, 20d are served in a similar manner. The top oven has a pipe 28a which is closed by a cap 46.

The manual shut-off valve 48 simply provides for a complete shut down of the system. Usually, this valve is left in an "on" position.

The automatic valve 29 is a conventional on/off device which meets any local safety standards. While such safety valves tend to be fairly uniform, various locations may have their own, non-standard governmental requirements. Therefore, the valve 29 has special meaning depending upon the geographical location of the oven.

Next, the modulating gas valve 30 is located to admit a regulated amount of gas into a burner 50. While any suitable burner may be used, a high efficiency burner is preferred. These burners are found in many appliances from heavy duty home heating to relatively light duty in appliances.

A blower 52 is coupled to the burner 50 via a suitable duct 54 in order to supply combustion air to the burner. When the burner first comes on there is a mixture of gas and forced air, which usually produces a very noisy roar; hence, a blower which switches off and on is noisy. The invention avoids this noise by modulating the flow of gas which never shuts off as demand increases and decreases when the oven temperature decreases or increases.

Figure 5A:
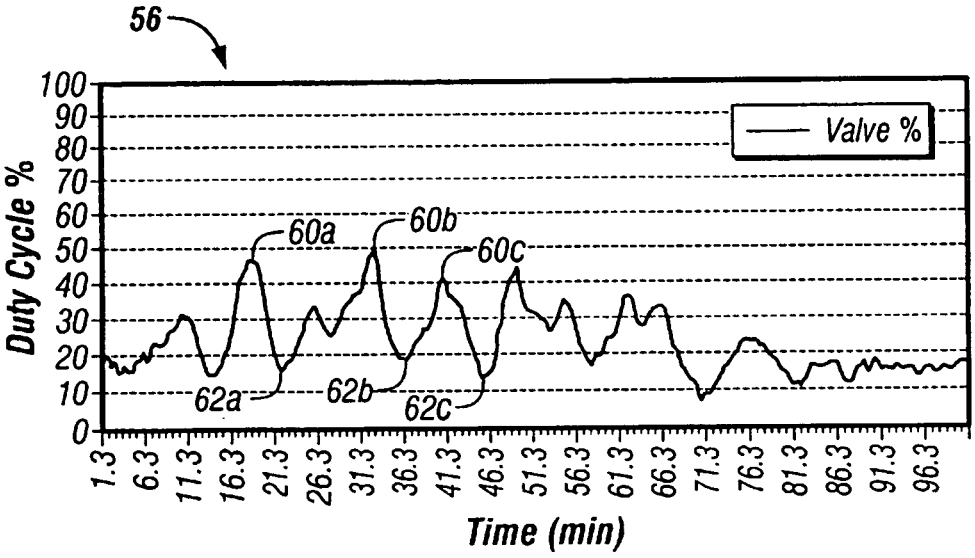
FIG. 5A (Prior Art)
FIG. 5 is a graph which illustrates the peaks and valleys of the burner duty cycle of the prior conveyor ovens using on/off gas valves.
Figure 5B:
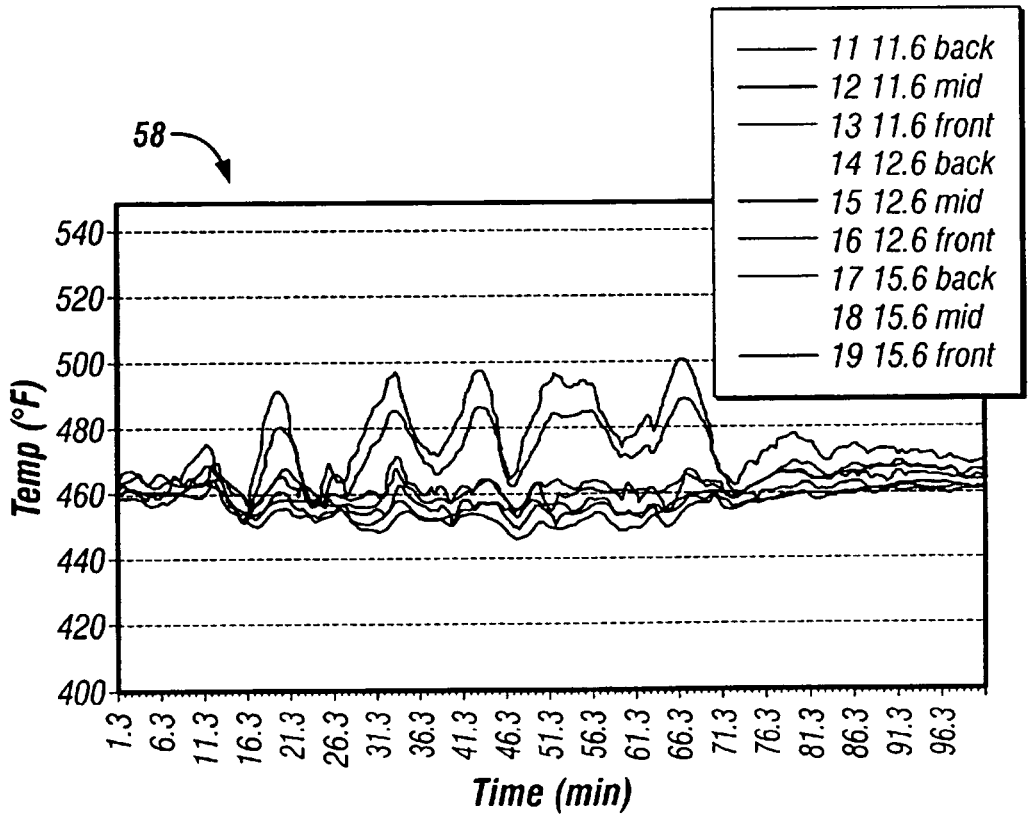
FIG. 5B (Prior Art)

FIG. 5 is a graph which discloses at 56 the duty cycle of the prior art burner as it responds to the temperature sensed in the oven and at 58 the temperature fluctuations at various locations in the oven. The prior art burner duty cycle 56 is shown as having peaks 60a, 60b, 60c, as the burner is generating maximum heat and valleys 62a, 60b, 60c when the burner is shut down. The peaks and valleys depend upon sensed oven temperatures. Those temperatures vary with ambient temperatures, drafts, frozen or thawed condition of the food product, etc. Hence, it is not possible to predict with any certainty as to the relationship between the appearances of the peaks and valleys relative to the excursion of the food product on the conveyor. As a result, the food product may have a variegated cooking or baking depending upon the peaks and valleys.

A second point indicated in FIG. 5 is that there is a considerable demand for fuel because the oven heats and cools depending upon the peaks and valleys. Hence, the burner has to work harder to repeatedly recover from a cool down when it is in the off stage.

Figure 6A:
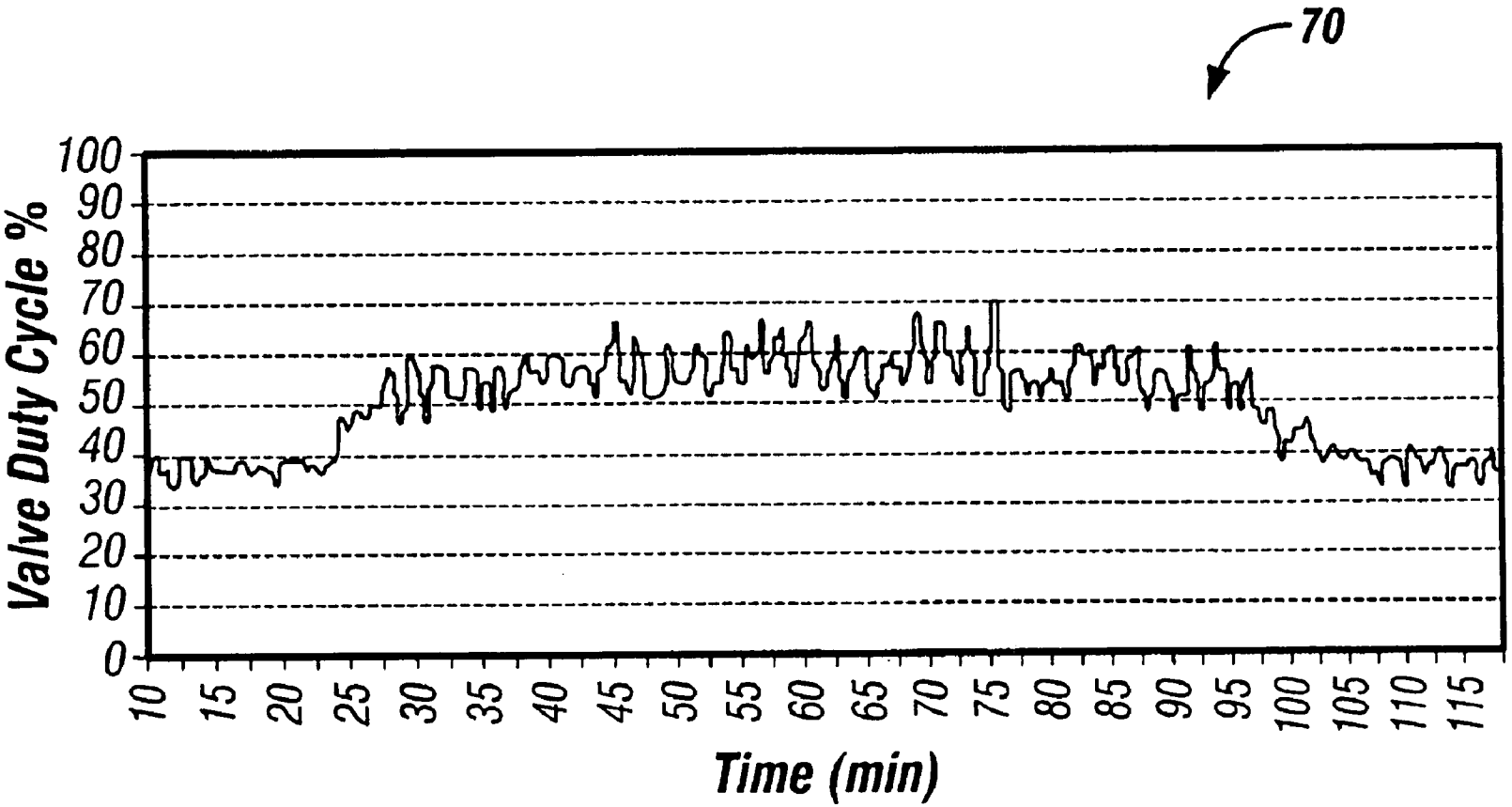
FIG. 6 is a graph which illustrates the continuous burner operation responsive to the inventive modulated gas flow.
Figure 6B:
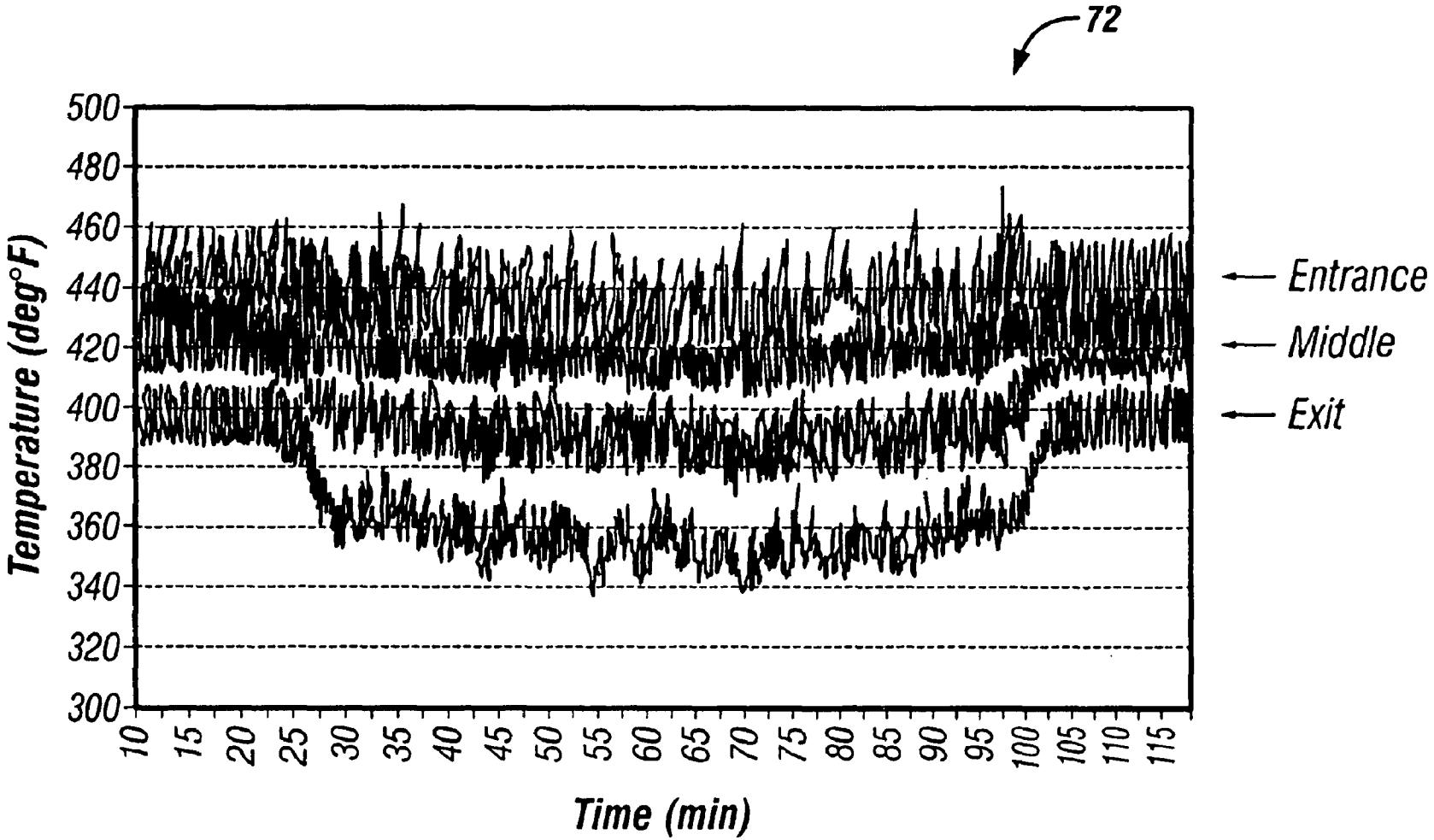

FIG. 6 is a graph similar to FIG. 5, but showing the operation responsive to the inventive use of the modulating valve 30. The flow of gas to the burner is seen in the curve 70. While the gas flow varies almost continuously, it is never off, so that the burner modulates its out put within a relatively narrow hand but does not shut down. Since the burner does not come on suddenly, there is no blow torch-like roar at the ignition. Curve 72 shows the temperatures sensed at the front, exit and middle of the oven. While this curve shows that the sensor does track the instantaneous variations of the heat put out by the burner, the average temperature in the oven is much more uniform over time.

The most important feature is that, in the prior art, the fuel required to maintain the burner operation represented by curve 56 (FIG. 5) is 30% greater than the fuel required to maintain the inventive burner operation represented by curve 70 (FIG. 6).

Figure 7A:
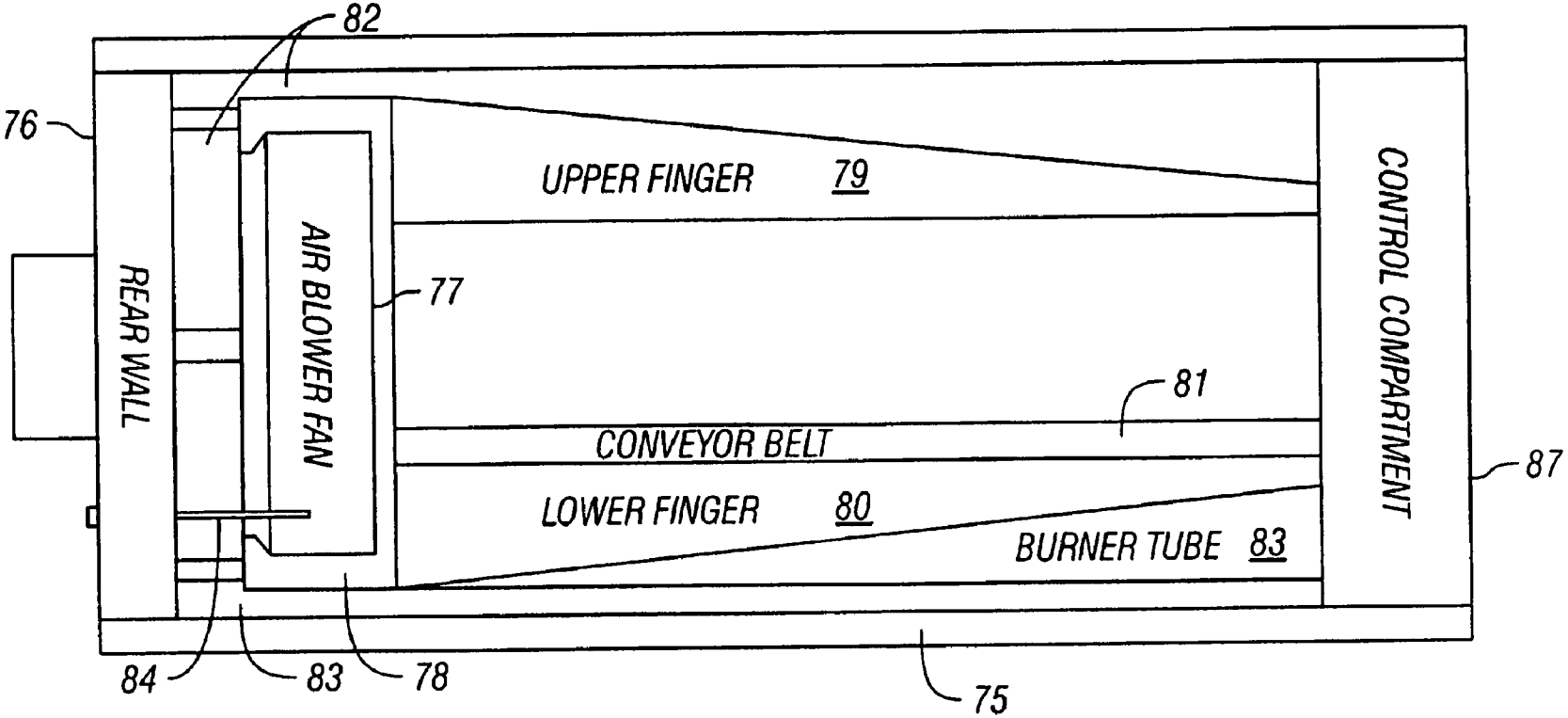

FIGS. 7A and 7B are simplified and schematic showings of the side elevation and top plan view of the inventive oven and are provided to show the location of two oven temperature sensors which feed the controller 30. In greater detail, the features shown in FIGS. 7A and 7B are the oven housing 75 that contains a rear wall 76[and], blower fan [compartment] *compartments* 77 [which together define an air supply plenum 78 between them. This] *and two air supply plenums 78. Each* plenum is pressurized by hot air that is driven into the oven via upper and lower fingers 79, 80, respectively. A conveyor 81 passes between the lingers 79, 80, carrying food products which are baked by the heat of the hot air discharged from the fingers. After the hot air is emitted from the fingers, it passes between the fingers and into an air return plenum 82, 83 above and below the fingers.

The oven contains three thermal couples which are seen in line in FIG. 7A so that only a high limit thermocouple sensor 84 appears. The high limit sensor 84 causes the oven to shut down if a predetermined threshold temperature is reached. This shut down is well below a hazardous level. The other two of these thermocouples which feed controller 32 are the control sensors 85, 86 seen in the plan view of FIG. 7B.

Figure 8:
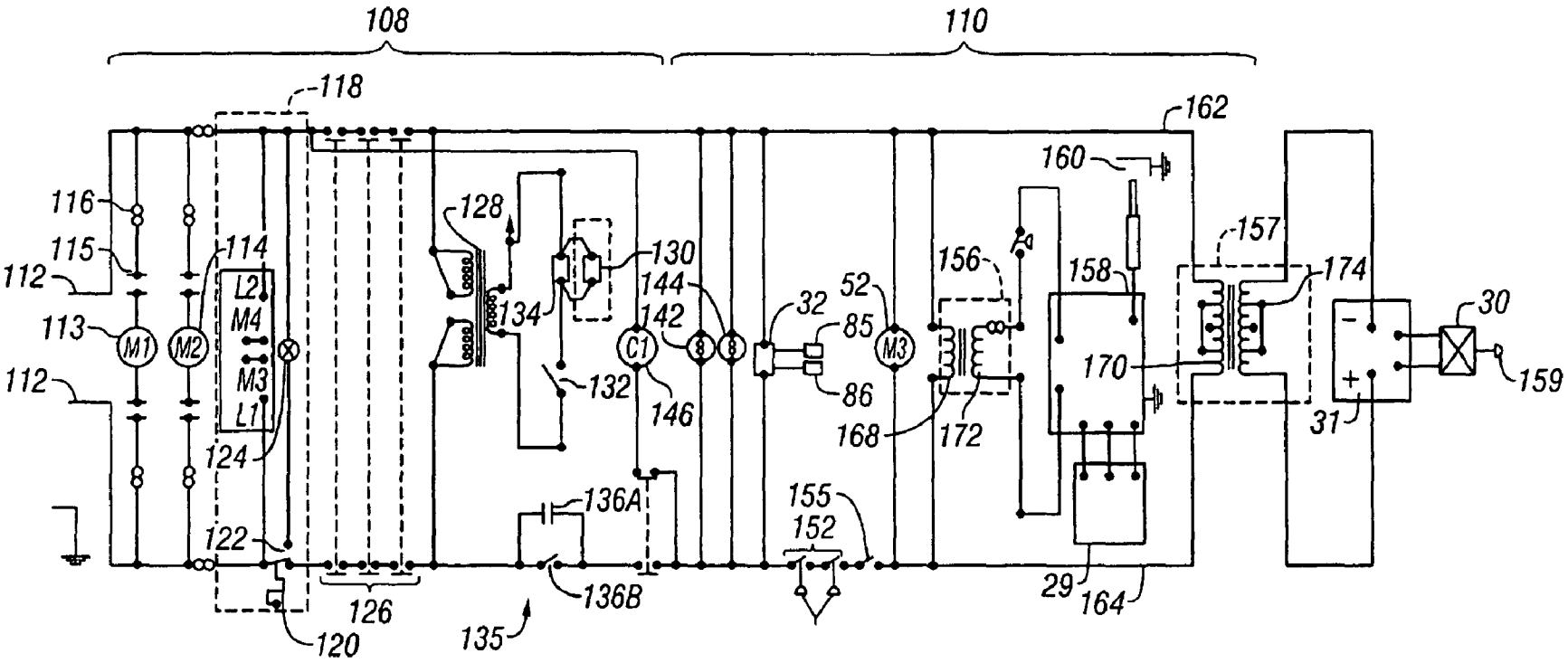
FIG. 8 is a control circuit diagram of the oven, the control circuit including an energy management system with a safety integrity enhancement.

The controls are in a compartment 87 at the front of the oven which is cooled by fans seen in FIG. 8.

FIG. 8 is a circuit diagram showing a control section 108 relating to the mechanical aspects and a control section 110 relating to the energy management system of the inventive oven.

The mechanical aspects 108 include blower motors 113, 114 which are connected to a suitable commercial power source 112 via switches (such as 115) and circuit breakers (such as 116). The blowers [76] *77* are in the [plenum 82] *plenums 78* to drive a stream of hot air into the oven cavity which is recycled between the fingers and back into the plenum. The high limit thermostat 118 does not normally provide an active function unless the temperature in the oven exceeds some preset threshold safety limit, beyond which the oven might go into a runaway condition. If that limit is exceeded, the contacts 120 open to shut down the oven while contacts 122 close to light a reset pilot lamp 124.

Next, there is a series circuit 126 of door switches which will prevent the oven from Operating unless all doors are suitably closed. If there are any other mechanical parts which have to be in any particular condition for the burner to switch on, associated switches (not shown) may also be provided in the series circuit 126.

A power transformer 128 provides power to the conveyor motor 130 which is turned on/off at switch 132. The motor has a suitable sensing mechanism for maintaining a stable speed selected at and under the control of a known circuit in control box 134.

The energy management system 110 controls the heat in the oven by modulating the delivery of gas to the burners. More particularly, a set of switches 135 either enables or disables the blower. If the blower shuts down, the contacts 136A open and the oven cannot be placed in operation until the manual switch 136B is closed. A coil 146 is energized when the burner blower switch 135 is closed to provide an interlock when the blower is on. The two fans 142, 144 blow cool air over the electronic and other controls in the control compartment 87 in order to prevent a malfunction as a result of over heating.

The temperature controller 32 receives signals from two sensors 85, 86 located [at plenum] *in plenums* 78 in the front end of a hot air stream for supplying heated air in the oven. The controller 32 is a product of the Honeywell Company. The switches 152 detect the presence of the various air streams in the oven. Basically, these switches have air sails in the oven at a location where they are moved by the air stream in order to open or close electrical switches. These sail switches are simply on/off switches to indicate the presence or absence of the air stream. Switch 155 is closed in order to heat the oven.

First and second isolation transformers 156, 157 supply 24V power for the electronic equipment coupled to their secondary windings respectively. In particular, transformer 156 supplies an ignition module 158 while transformer 157 supplies signal conditioner 31, thereby isolating the two from each other. The controller 32 is supplied from the power line 112. Signal conditioner 31 responds to signals which it receives from the controller 32 and converts them into signals which control the modulating valve 30. A push button 159 must be pressed to reset the modulating valve 30 after it shuts down.

An ignition module 158 is adapted to ignite and maintain a pilot flame that initiates the gas of burner 50 (FIG. 4). An associated sensor 160 signals the presence of a pilot flame. The safety gas valve shown at 29 has the characteristics prescribed by an appropriate governmental regulation in order to shut down the oven under predetermined hazardous conditions.

Means are provided to enhance the integrity of the safety features. Accordingly, even though there are many safety features on the oven so that it automatically shuts down well before any catastrophic condition is reached, it is conceivable that there could be a feed back condition in a loop extending between the controller 32, the signal conditioner 31, and the ignition module 158, which might interfere with the response of the safety valve 29.

Therefore, it is desirable to provide a safety integrity enhancement by the electrical isolation between the controller 30, conditioner 31 and ignition module 158, which would prevent such feed back.

The power line voltage (here 240V) applied at 112 appears across line conductors 162 and 164. Controller 32 is connected directly across the line so that there will not be any feed back to it via the lint 162, 164 from either signal conditioner 31 or the ignition module 158. The two transformers 156 and 157 have primary windings 168 and 170 connected in parallel across the power line conductors 162, 164, so that the primaries are not affected by events after the secondaries. The secondary winding 172 of transformer 156 supplies the 24V power to ignition module 158 and to the governmental prescribed safety switch 29. The secondary winding 174 of transformer 174 supplies 24V to the signal conditioner 31 and modulating valve 30.

Hence, there is no single path forming a feed back loop for causing an interaction between the controller 32 and conditioner 31, and ignition module 158.

Figure 9:
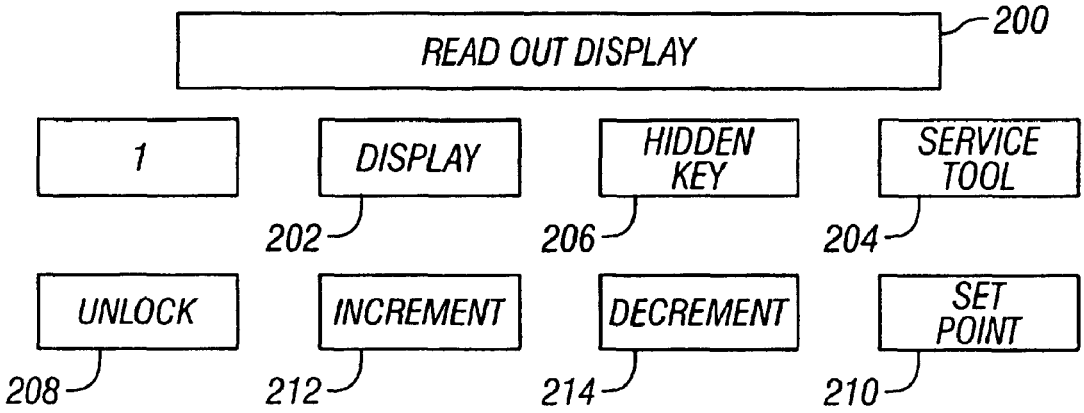
FIG. 9 is a flow chart showing the capability of the controller for the modulating valve.

A layout of a front panel control panel is shown at the top of FIG. 9. There are a display panel and eight push buttons. A list of control panel functions are shown at the bottom of FIG. 9 to help explain the features of controller 32. The push button "1" is a blank which has no preselected purpose, but which is available to control any customized feature which the owner of the oven may request.

A four digit numeral display 200 displays either the process variables or the setpoint during normal operation. The right-most digit of this display shows whether the displayed value is in terms of degrees in Fahrenheit or in Centigrade. Alternate information is also displayed during the service depending upon the function being carried out.

A "heat on" indicator is illuminated when the controller is applying an output of 3% or more heat. When an on/off control is configured, the "heat-on" indicator is illuminated when an output heat is provided. Either the present temperature or the programmed setpoint temperature may be displayed. A simultaneous pressing of both the unlock and the display keys 208, 202 will display the value of the heat output with the heat on indicator on. With the output unlocked at key 208, the user is able to cycle through actual temperature display indicators to reveal the actual temperatures, setpoint temperature, and the heat on condition. When the setpoint displays "yes", it is not possible to change the setpoint.

A locked setpoint condition can be temporarily unlocked at key 210 for making an adjustment of the programmed oven temperature. Sixty seconds later, the setpoint automatically returns to the locked state if no further control operations are carried out after the last press of the display key 202. When the 60 second time period expires, the controller 32 is locked and the display return to the default display.

The output display is automatically locked in a default display when a service man or operator places the controller in the service mode by pressing key 204 or when the hidden key 206 is pressed while the output display is shown. A failsafe condition occurs when any one of the various tests fail, at which time, a flashing signal display is alternately displayed with temperature.

If the oven has not reached 200° F. within fifteen (15) minutes after an initial power-up of the oven, a message is flashed on the display panel indicating that the controls need to be reset (power-cycled). If a thermocouple sensor fails to operate properly, the display will flash "open". If the polarity of the thermocouple leads are reversed, the display will flash a signal indicating the thermocouple leads are incorrectly connected to the instrument.

The displays also provide prompts for servicing the oven responsive to a simultaneous pressing of the unlock key 208 and the service tool key 204. Each additional press of the service tool key 204 advances the prompts in the order shown under "service mode" in FIG. 9. The user can continually sequence through the service prompts by repeatedly pressing the service tool key 204. The service mode is exited by either pressing the display key 202 or pressing no key for sixty seconds. Either way, the system automatically returns to the normal mode.

Setpoint lock key 210 automatically flashes the temperature that has been selected for an operation of the oven. The setpoint can be changed up or down by pressing either the increment or decrement keys 212, 214. The degrees (° F. or ° C.) used for the prompts is changed by pressing either the increment or decrement keys. While at the degrees ° F. or ° C. prompt, a selection of "F" or "C" automatically changes the units of all the display to ° F. or ° C. While the default display prompt is being displayed, an indicator flashes to indicate which display is chosen as the default display, which can be changed by pressing either the increment or decrement keys.

Those who are skilled in the art will readily perceive various modifications that fall within the scope and spirit of the invention. Therefore, the appended claims are to be construed to cover all equivalents.

The claimed invention is:

1. A conveyor oven control comprising an energy management system for controlling a flowing stream of hot air through *a cavity of* an oven for baking a food product; a conveyor extending through said cavity for conveying said food product through said oven; a fuel gas line for conveying fuel gas from a source to a burner in said oven; said energy management system being interposed in said fuel gas line and between said source and said burner for controlling a flow of fuel gas to said burner; said energy management system comprising a controller, a signal conditioner, a fuel gas valve, and an ignition module; a safety shut down valve [associated] *connected* with said ignition module to prevent said ignition module from re-igniting said burner during hazardous conditions; a pair of sensors in said oven for sensing instantaneous oven temperatures; said controller being responsive to said sensed temperatures for controlling said energy management system to regulate operation of said fuel gas valve and, thereby, the flow of fuel gas to the burner in order to maintain oven temperature within a predetermined range, said signal conditioner being responsive to said controller for providing signals that control said fuel gas valve; and a pair of transformers, one transformer being coupled to energize said signal conditioner and *to electrically isolate said signal condi-*

*tioner from said ignition module, and* the other transformer being coupled to energize said [signal] ignition module *and to electrically isolate said ignition module from said signal conditioner, the pair of transformers connected in parallel with each other and with said controller* to prevent an electrical feed back [which might otherwise defeat the safety shut down valve] *between said signal conditioner and said ignition module*.

2. The conveyor oven of claim 1 wherein said fuel gas valve comprises a diaphragm closing a chamber having an internal pressure controlled by fluctuations of oven temperatures, a main valve in said fuel gas valve coupled to move with said diaphragm for regulating an amount of fuel gas flowing from said source through said fuel gas line to said burner in response to movement of said diaphragm, and a tap line for applying said pressure in said chamber acting on said diaphragm in response to said sensors whereby the flow of said fuel gas through said main valve in said fuel gas valve to said burner is regulated as a function of said instantaneous oven temperature.

3. The conveyor oven of claim 2 and a by-pass line for enabling a limited amount of fuel gas to flow around said main valve of said fuel gas valve whereby said burner continues to burn and does not shut down while said main valve is closed.

4. The conveyor oven of claim 1 wherein said burner heats air in a plenum at an input end of said oven from which hot air is driven through said cavity, said sensors being located at different places in a plenum.

5. A conveyor oven for automatically baking a food product over a timed period under the control of an energy management system, said oven comprising a cavity having a burner associated therewith for providing heated air in said cavity, a fuel gas line for delivering fuel gas to said burner via said energy management system, said burner heating air in a plenum, a system for delivering said stream of heated air from said plenum through said cavity and returning at least a portion of said stream to said plenum, a pair of sensors at different locations in said plenum for sensing an instantaneous temperature of said heated air in said plenum, a valve for modulating the fuel gas delivered to said burner responsive to said sensed instantaneous oven temperature, said delivered fuel gas comprising at least a minimum amount of fuel gas so that said burner [means] remains in continuous operation regardless of said modulation of fuel gas delivered to said burner, a controller responsive to said sensors for providing signals for regulating said fuel gas valve, a signal conditioner, and an ignition module, said signal conditioner converting said signals provided by said controller into control signals for operating said fuel gas modulating valve, and a pair of transformers, one transformer being coupled to energize said signal conditioner and *to electrically isolate said signal conditioner from said ignition module and* the other transformer being coupled to energize said ignition module *and to electrically isolate said ignition module from said signal conditioner, wherein the pair of transformers are connected in parallel with each other and with said controller* to prevent an electrical feedback between said signal conditioner and said ignition module.

6. The oven of claim 5 and a conveyor for delivering a food product through said cavity over a timed period during which said burner continuously delivers heat to said cavity, said heat baking said product as it is conveyed through said oven, and a line for bypassing said minimum amount of fuel gas around said fuel gas modulating valve in order to prevent said burner [means] from shutting down during periods while said controller is not calling for heat.

7. An energy management system for a conveyor oven that bakes a food product during a passage through said oven, said energy management system delivering a flowing stream of hot air from a burner and over said food product during said passage and comprising a fuel gas valve, a controller for sensing and regulating the temperature of said stream of hot air, a signal conditioner responsive to said controller for producing signals required to operate said fuel gas valve, an ignition module, and a pair of transformers, one of said transformers delivering power to *and providing electrical isolation for* said signal conditioner, and the other of said transformers delivering power to *and providing electrical isolation for* said ignition module*, wherein the pair of transformers are coupled in parallel with each other and with said controller* to prevent an electrical feed back signal between [them] *the signal conditioner and the ignition module*.

8. The system of claim 7 wherein said fuel gas valve has a pressure chamber closed by a diaphragm which expands and contracts in response to the pressure in said chamber, said pressure increasing and decreasing in said chamber jointly responsive to said controller and said signal conditioner as a function of the temperature of said stream of hot air, a fuel gas line, and a main valve in said fuel gas line, said main valve being connected to said diaphragm whereby said main valve opens and closes as said diaphragm expands and contracts in order to modulate a flow of fuel gas in said line.

9. The system of claim 8 and a by-pass line around said main valve, said bypass line delivering enough fuel gas to continuously maintain said burner in at least a minimum heat condition despite operation of said main valve responsive to said diaphragm.

10. A conveyor oven comprising a modulating fuel gas valve for supplying heat to said oven; a controller; a signal conditioner for converting signals from said controller into signals for operating said fuel gas modulating valve; an on/off safety valve in said fuel gas line to automatically shut down said oven during predetermined conditions; an ignition module for igniting fuel gas delivered by said safety valve; and an electrical control circuit for operating said fuel gas modulating valve, controller, conditioner, and ignition module, said circuit having a first section relating to mechanical parts of the oven and a second section relating to energy management of heat delivery in said oven, and said electrical control circuit having electrical isolation for preventing a feed back of electrical signals [which might prevent shut down of said safety valve during said predetermined conditions] *between said signal conditioner and said ignition module*;

wherein said second section includes first and second transformers coupled in parallel *with each other and with said controller* to provide said isolation between [their] secondary windings *of the first and second transformers*, one of said secondary windings supplying power to *and electrically isolating* said signal conditioner *and not supplying power to said ignition module,* and the other of said secondary windings supplying power to *and electrically isolating* said ignition module *and not supplying power to said signal conditioner*, said safety valve being coupled to supply fuel gas via said ignition module.

11. The oven of claim 10, and a pair of sensors for detecting heat in said oven, said sensors being coupled to drive said controller, said signal conditioner being coupled to operate said fuel gas modulating valve, and a coupling from said controller to *said signal* conditioner whereby heat detected by said sensors controls said fuel gas modulating valve.

* * * * *